United States Patent
Qi et al.

(10) Patent No.: US 7,706,556 B2
(45) Date of Patent: Apr. 27, 2010

(54) MOBILE WIRELESS COMMUNICATIONS DEVICE WITH SLIDABLE CONFIGURATION PROVIDING HEARING AID COMPATIBILITY FEATURES AND RELATED METHODS

(75) Inventors: Yihong Qi, Waterloo (CA); Perry Jarmuszewski, Waterloo (CA); Ying Tong Man, Kitchener (CA)

(73) Assignee: Research in Motion Limited, Waterloo, Ontario (CA)

( * ) Notice: Subject to any disclaimer, the term of this patent is extended or adjusted under 35 U.S.C. 154(b) by 1377 days.

(21) Appl. No.: 11/025,752

(22) Filed: Dec. 29, 2004

(65) Prior Publication Data
US 2006/0140428 A1 Jun. 29, 2006

(51) Int. Cl.
H04R 25/00 (2006.01)
(52) U.S. Cl. .......................... 381/315; 381/322; 379/52
(58) Field of Classification Search ................. 381/312, 381/322, 328, 330, 331, 315; 379/52, 431, 379/440, 443, 444; 343/700 MS, 702, 726; 455/575.1, 575.4, 575.7
See application file for complete search history.

(56) References Cited

U.S. PATENT DOCUMENTS

| | | | | |
|---|---|---|---|---|
| 3,396,245 | A * | 8/1968 | Flygstad | 381/331 |
| 5,337,061 | A | 8/1994 | Pye et al. | 343/702 |
| 5,557,293 | A | 9/1996 | McCoy et al. | 343/867 |
| 5,819,162 | A | 10/1998 | Spann et al. | 455/90 |
| 6,009,311 | A | 12/1999 | Killion et al. | 455/63 |
| 6,122,500 | A | 9/2000 | Dent et al. | 455/414 |
| 6,137,883 | A | 10/2000 | Kaschke et al. | 379/433 |
| 6,600,450 | B1 * | 7/2003 | Efanov et al. | 343/726 |
| 6,639,564 | B2 | 10/2003 | Johnson | 343/702 |
| 6,741,215 | B2 | 5/2004 | Grant et al. | 343/702 |
| 6,925,179 | B2 * | 8/2005 | Waldron et al. | 379/443 |
| 7,088,294 | B2 * | 8/2006 | Qi et al. | 343/702 |

(Continued)

FOREIGN PATENT DOCUMENTS

DE 4316073 11/1994

(Continued)

OTHER PUBLICATIONS

"Manual: GPRS Telephone SGH-D500", Nov. 2004, Samsung Electronics, Korea, XP002324577.

(Continued)

Primary Examiner—Huyen D Le
(74) Attorney, Agent, or Firm—Allen, Dyer, Doppelt, Milbrath & Gilchrist, P.A.

(57) ABSTRACT

A mobile wireless communications device is for a user wearing an electronic hearing aid adjacent an ear of the user and may include an upper housing and a lower housing being slidably connected together for sliding between a retracted position and an extended use position. An audio output transducer may be carried by the upper housing and accessible to the hearing aid of the user adjacent a top end of the upper housing, and an audio input transducer may be carried by the lower housing and accessible to a mouth of the user adjacent a bottom end of the lower housing. An antenna may be carried by the lower housing adjacent the bottom end thereof so that the hearing aid is further separated from the antenna when the upper and lower housings are in the extended use position to reduce undesired coupling from the antenna to the hearing aid.

32 Claims, 9 Drawing Sheets

U.S. PATENT DOCUMENTS 7,469,156 B2 * 12/2008 Kota et al. ............... 455/575.4

FOREIGN PATENT DOCUMENTS

FR 2679086 1/1993

OTHER PUBLICATIONS

Siemens, SL65, Which Side Will You Fall for?, 2004, product description, available at www.siemens-mobile.com.

Siemens, SL55, A Jewel Among Mobiles, 2004, product description, available at www.siemens-mobile.com.

Samsung SCH-N330, 2004, product description available at www.phonescoop.com.

Sumsung SCH-N330 Review-Specifications, 2004, product description available at www.phonyworld.com.

* cited by examiner

MOBILE WIRELESS COMMUNICATIONS DEVICE WITH SLIDABLE CONFIGURATION PROVIDING HEARING AID COMPATIBILITY FEATURES AND RELATED METHODS

FIELD OF THE INVENTION

The present invention relates to the field of communications devices, and, more particularly, to mobile wireless communications devices and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network.

Even so, as the functionality of cellular communications devices continues to increase, so too does the demand for smaller devices which are easier for users to carry. As a result, one style of cellular telephones which has gained wide popularity is the folding or "flip" phone. Flip phones typically have an upper housing with a display and speaker, and a lower housing or flap which carries the microphone. The keypad of such phones may be on either the upper housing or the lower housing, depending upon the particular model. The lower flap is connected to the upper housing by a hinge so that when not in use the upper and lower housings can be folded together to be more compact.

One example of a flip phone is disclosed in U.S. Pat. No. 5,337,061 to Pye et al. The phone has two antennas, a first one of which is mounted on the lower flap and includes a ground plane and an active monopole fed by a coaxial feed from electronic circuitry inside the phone. The flap is pivotally connected to the main or upper section of the housing, and is folded against the main section when not in use. Another similar antenna is fitted in the main section, and both antennas are connected to transceiver circuitry in the phone. The antennas are designed to introduce deliberate mismatch to provide an effective switching system between the antennas without the need for separate circuit elements. Other examples of flip phones are disclosed in U.S. Pat. Nos. 5,557,293 and 6,741,215.

Another compact style of cellular telephone is the so-called sliding phone. Sliding phones have upper and lower housings which are slidably connected to one another so that one housing slides over top of the other, and they slide relative to one another between a retracted position and an extended position. As such, these phones may also provide a relatively compact footprint when in the retracted position. Examples of sliding phones include the SL55 from Siemens Corporation, and the SCH-N330 from Samsung Electronics Co., Ltd.

One potential drawback of compact cellular telephone designs is that users with hearing aids may have difficulties using such phones. That is, the compact nature of such phones may place the user's hearing aid in close proximity to the phone's antenna. This, in turn, can cause undesired interference, which results in harmonics being introduced into the hearing aid. One approach for addressing this problem on a cellular telephone with an external antenna is disclosed in U.S. Pat. No. 5,819,162 to Spann et al., in which an electromagnetic interference (EMI) shield is mounted on a flap that extends away from the base of the phone during operation to form an enclosure about the user's ear for shielding the user's hearing aid from EMI. However, such a configuration may not be feasible on compact sliding phones which have internal, printed circuit board (PCB) style antennas.

SUMMARY OF THE INVENTION

In view of the foregoing background, it is therefore an object of the present invention to provide a relatively compact mobile wireless communications device, such as a cellular telephone, which is also well-suited for use with electronic hearing aids and related methods.

This and other objects, features, and advantages in accordance with the present invention are provided by a mobile wireless communications device for a user wearing an electronic hearing aid adjacent an ear of the user. The mobile wireless communications device may include an upper housing and a lower housing being slidably connected together for sliding relative to one another between a retracted position and an extended use position. The upper and lower housings may each have respective top and bottom ends, and the top end of the upper housing may be further separated from the bottom end of the lower housing when in the extended use position as compared to the retracted position.

The mobile wireless communications device may further include an audio output transducer carried by the upper housing and accessible to the electronic hearing aid of the user adjacent the top end of the upper housing. An audio input transducer may be carried by the lower housing and accessible to a mouth of the user adjacent the bottom end of the lower housing. Furthermore, an antenna may be carried by the lower housing adjacent the bottom end thereof so that the electronic hearing aid of the user is further separated from the antenna when the upper and lower housings are in the extended use position. Accordingly, undesired coupling from the antenna to the electronic hearing aid is thereby reduced.

More particularly, the bottom of the upper housing may overlap the top of the lower housing in the extended use position defining an overlap region, and the antenna may be below the overlap region. A wireless circuit board may be carried by the lower housing, and at least one wireless communications circuit may be carried by the wireless communications circuit board. The at least one wireless communications circuit may be connected to the antenna.

In addition, the antenna may be carried within the lower housing. The antenna may include a dielectric substrate and a plurality of conductive traces on the dielectric substrate, for example. Moreover, the antenna may be a multi-frequency band antenna, and it may include a single turn, main loop conductor having a gap therein defining first and second ends of the main loop conductor.

The mobile wireless communications device may further include a release catch for allowing movement of the upper housing and the lower housing between the retracted to the extended position. A display may be carried by the upper housing, while an input keypad and a battery may be carried by the lower housing. The input keypad may include a plurality of multi-symbol keys. Moreover, the symbols may be letters, and the multi-symbol keys may be arranged to define a QWERTY layout. Additionally, at least some of the multi-symbol keys may have numeric indicia thereon, and the at least some multi-symbol keys may be arranged to define a telephone keypad layout.

Method aspects of the invention include making a mobile wireless communications device, such as the one described briefly above, as well as making such a device hearing aid compatible by positioning the antenna therein as also briefly described above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
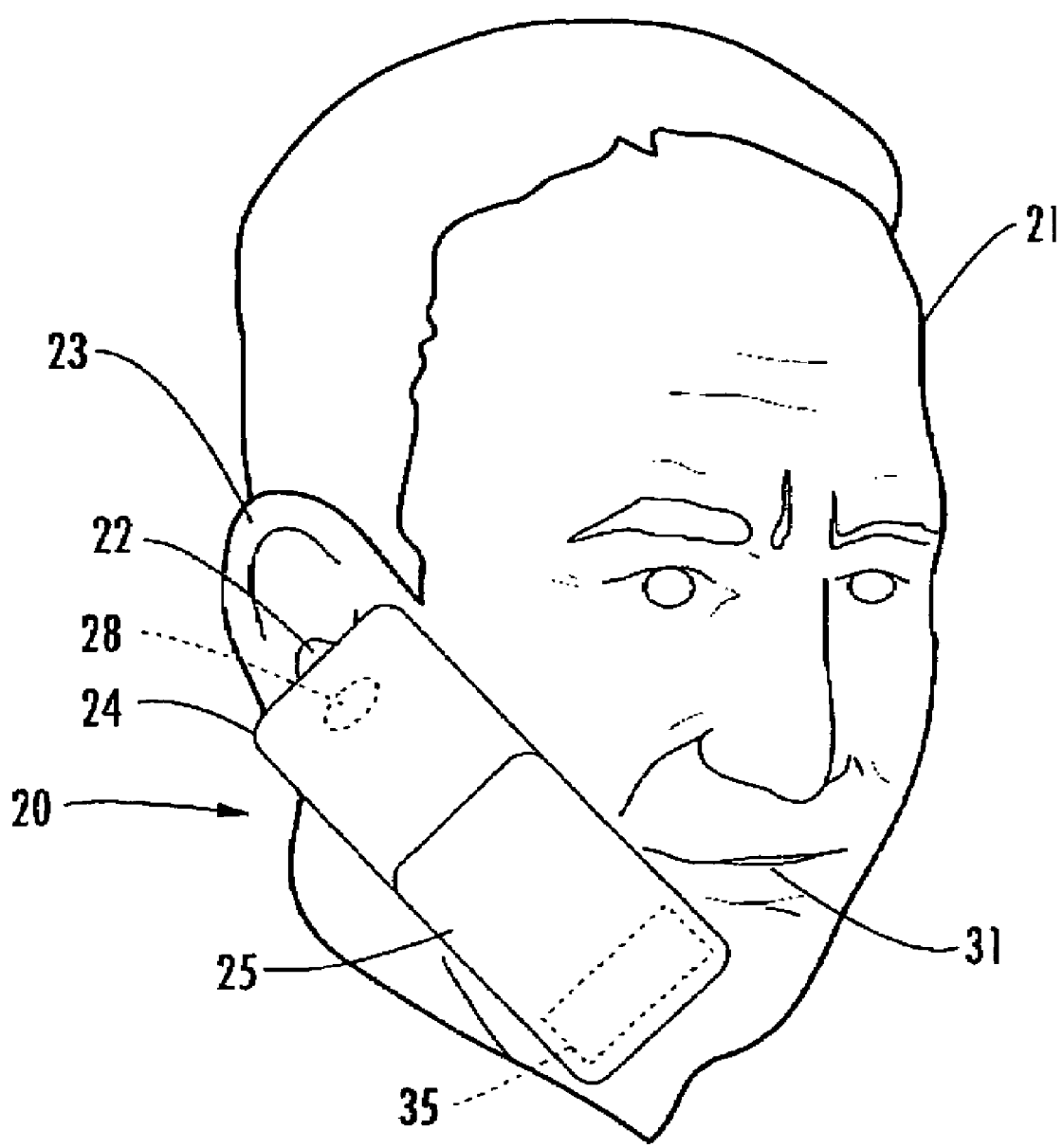
FIG. 1 is a perspective view of a mobile wireless communications device in accordance with the present invention next to a user wearing an electronic hearing aid.
Figure 2:
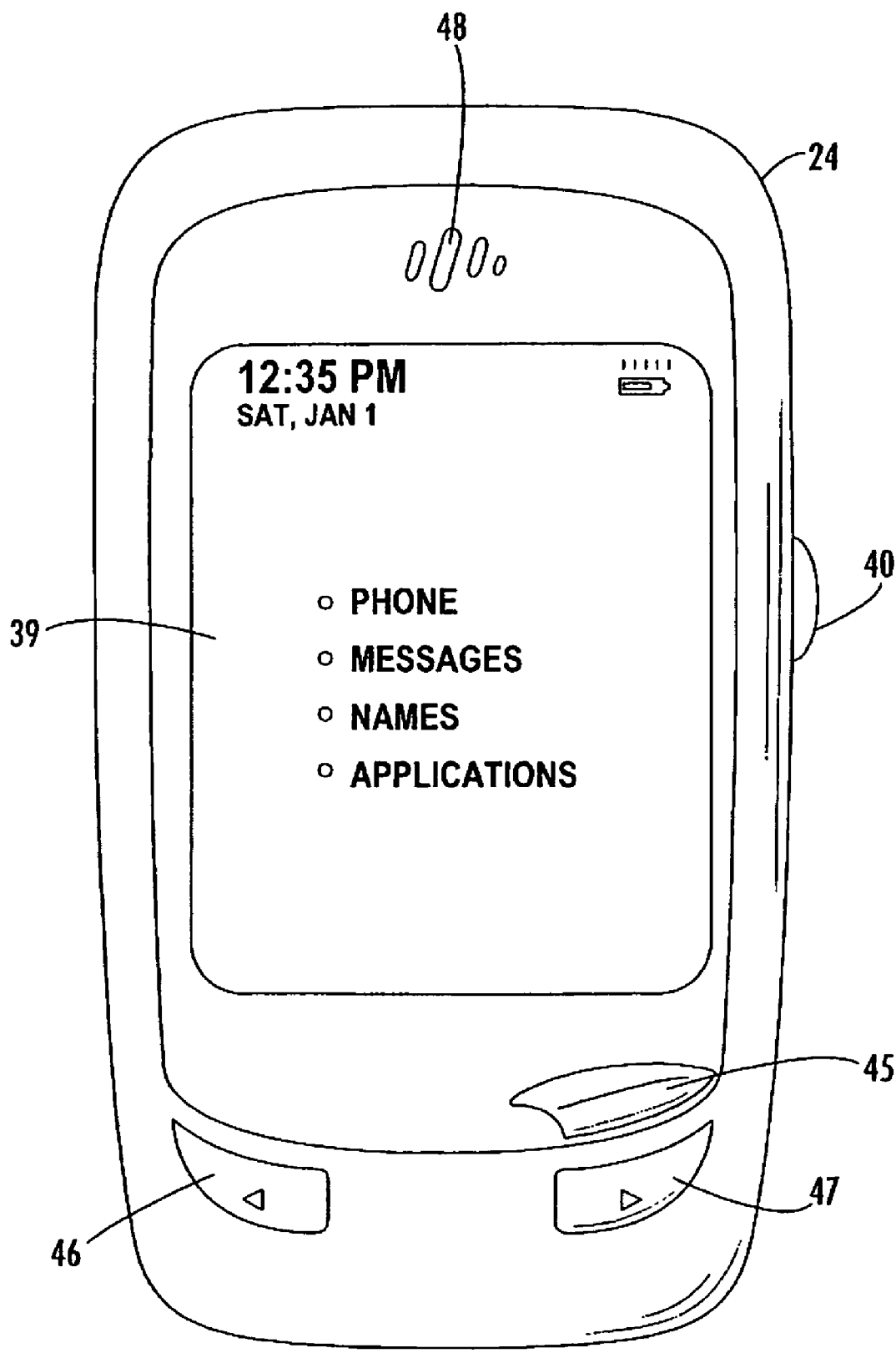
FIG. 2 is a front view of the mobile wireless communications device of FIG. 1 in a retracted position.
Figure 3:
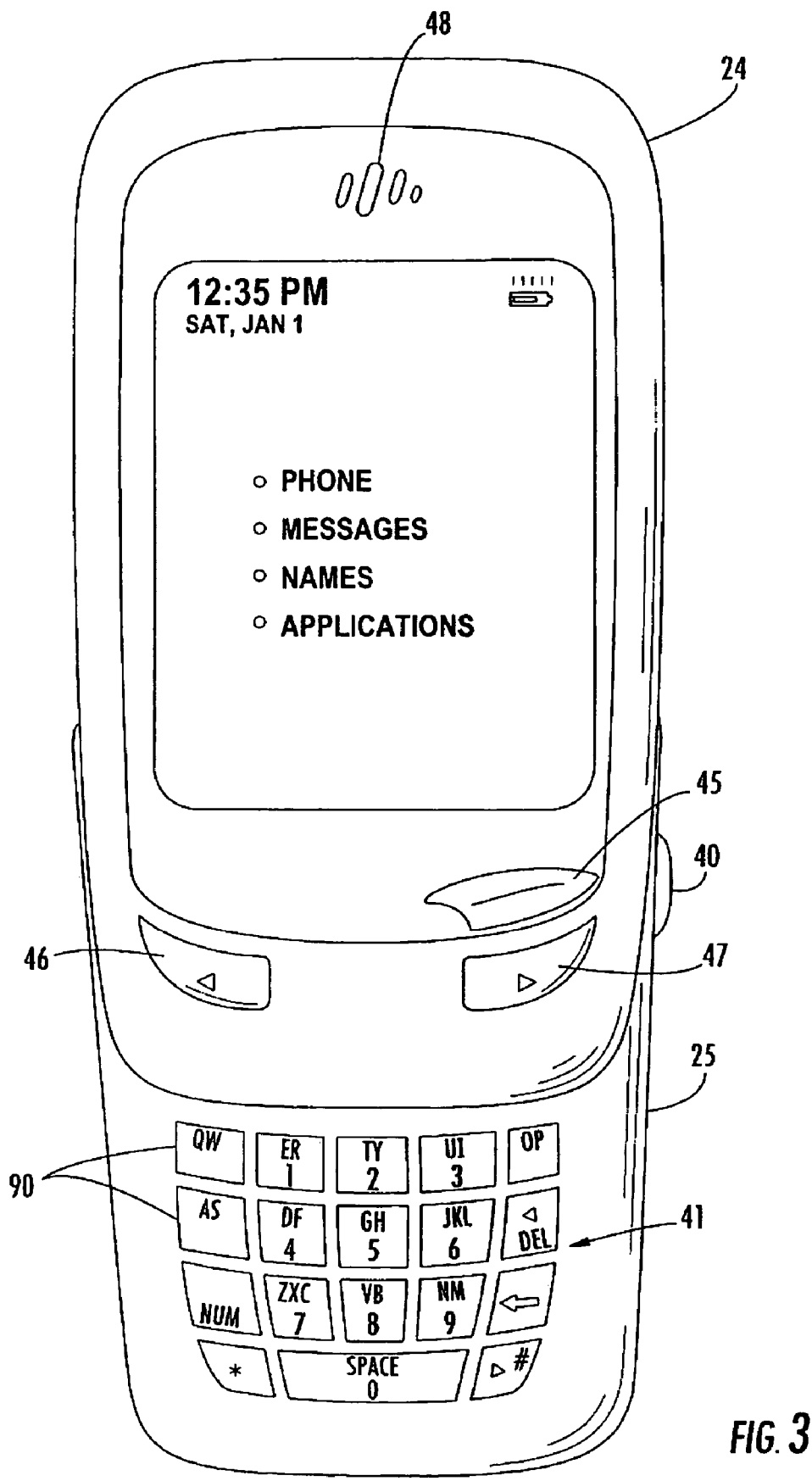
FIG. 3 is a front view of the mobile wireless communications device of FIG. 1 in an extended use position.
Figure 4:
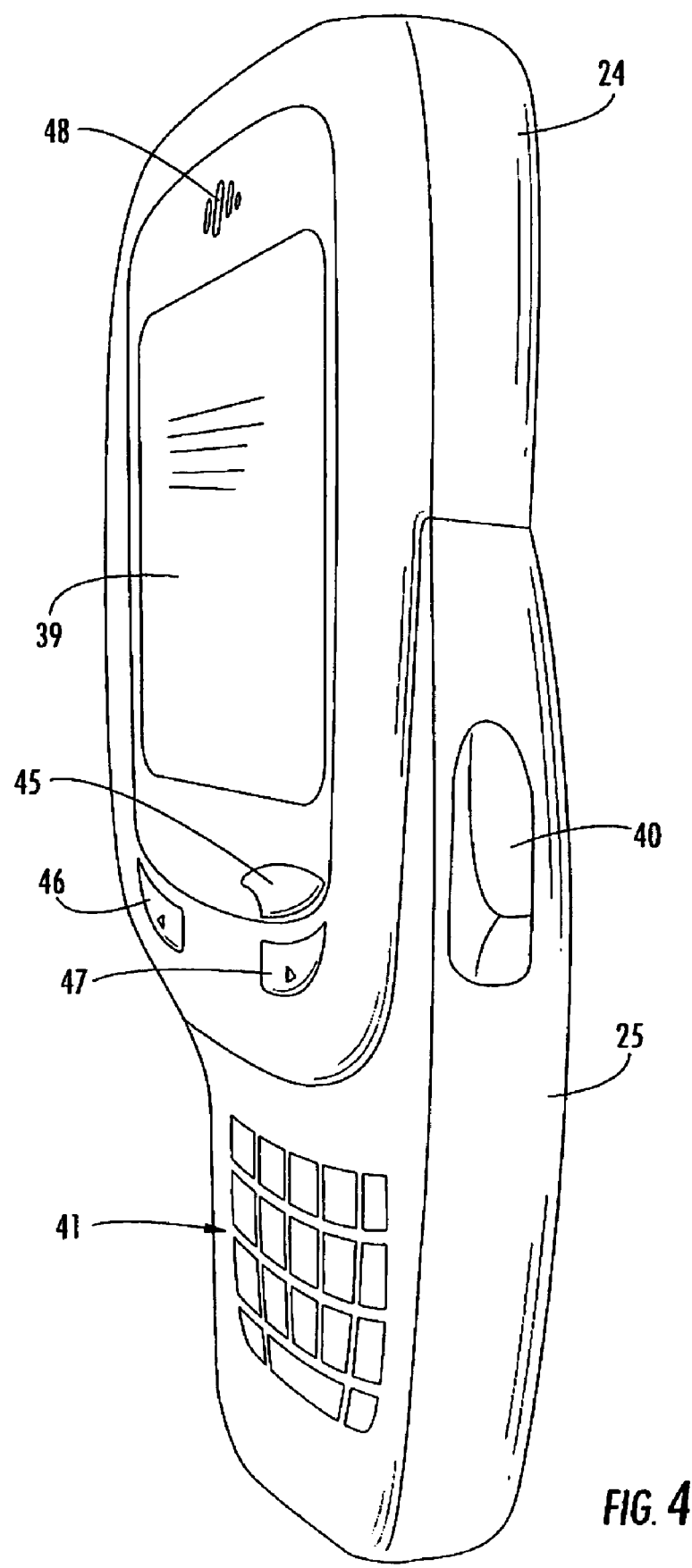
FIG. 4 is a perspective view of the mobile wireless communications device of FIG. 1 in the extended use position.

Referring initially to FIGS. 1 through 5, a mobile wireless communications device, such as a cellular telephone 20, is for a user 21 wearing an electronic hearing aid 22 adjacent an ear 23 of the user. The cellular telephone 20 is a sliding phone which illustratively includes an upper housing 24 and a lower housing 25 being slidably connected together for sliding relative to one another between a retracted position (FIG. 2) and an extended use position (FIG. 3). A release catch 40 allows movement of the upper housing 24 and the lower housing 25 between the retracted and extended use positions, as will be appreciated by those skilled in the art.

Figure 5:
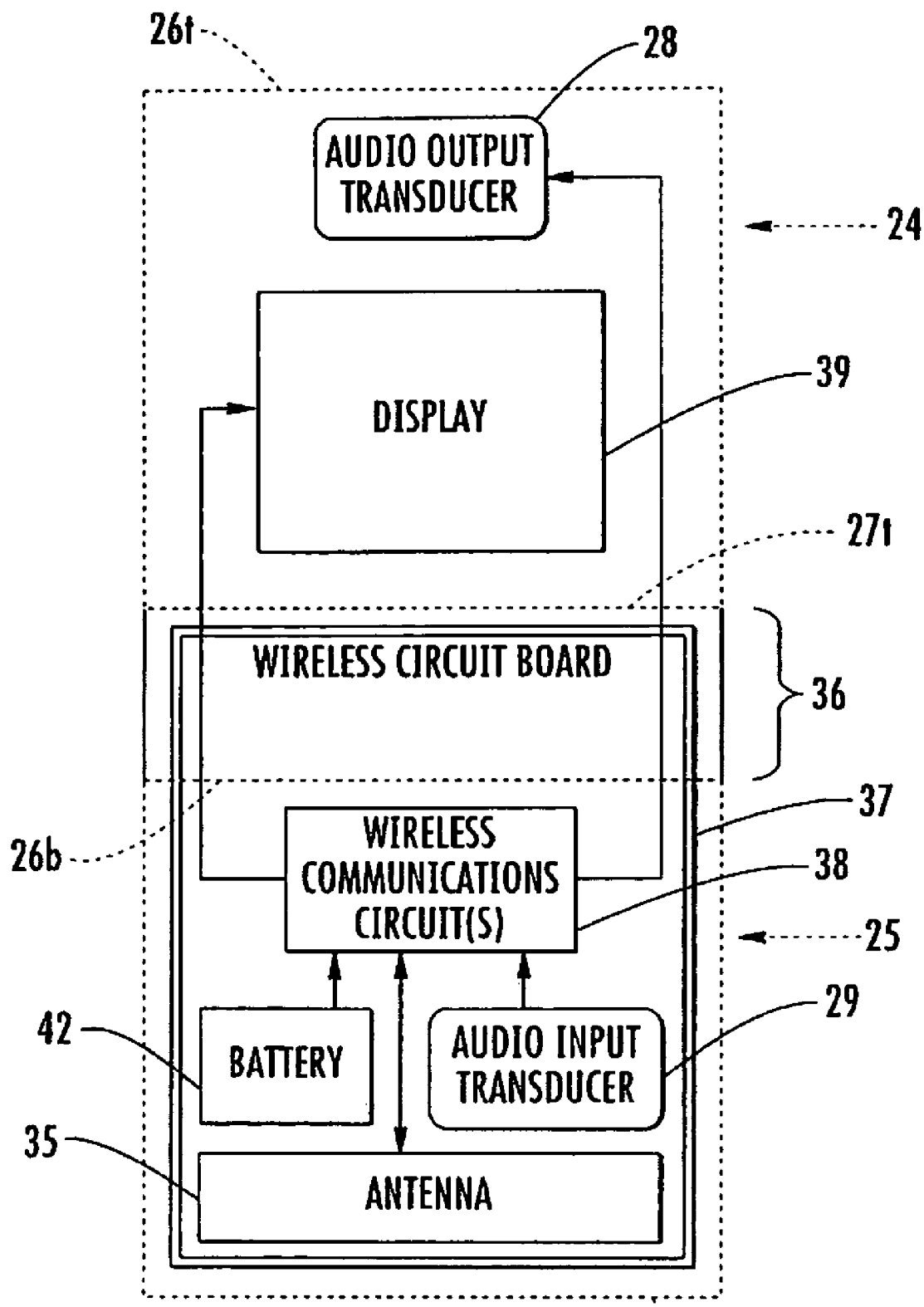
FIG. 5 is a schematic block diagram of the mobile wireless communications device of FIG. 1.

The upper and lower housings 24, 25 each have respective top and bottom ends 26t, 26b and 27t, 27b (see FIG. 5). The top end 26t of the upper housing 24 is further separated from the bottom end 27b of the lower housing 25 when in the extended use position as compared to the retracted position. When in the extended user position, an input keypad 41 carried by the lower housing 25 becomes accessible to the user. As shown in FIG. 3, the keypad 41 may include multi-symbol alphanumeric keys 90 that may be used not only for dialing telephone numbers, but also for sending e-mail or text messages, accessing an address or contact book, and running other applications (games, calendars, etc.), as will be appreciated by those skilled in the art. An on/off button 45 and scroll buttons 46, 47 are carried by the upper housing 24 and are accessible to the user 21 in both the retracted and extended use positions. The scroll buttons 46, 47 may be used for selecting menu options, e-mail messages, etc.

In particular, the multi-symbol keys 90 are arranged in the first (i.e., top) three rows on the keypad 41 (although other function keys are located in these rows as well). Furthermore, the letter symbols on each of the keys 90 are arranged to define a QWERTY layout. That is, the letters on the keypad 41 are presented in a three-row format, with the letters of each row being in the same order and relative position as in a standard QWERTY keyboard or keypad.

The first three rows of keys are further arranged in five columns. The multi-symbol keys 90 in the second, third, and fourth columns of the first, second, and third rows have numeric indicia thereon (i.e., 1 through 9) accessible by first actuating the NUM key in the third row. Together with the star ("*"), space/0, and shift/pound ("#") keys in the fourth row, these keys define a standard telephone keypad layout, as would be found on a traditional touch-tone telephone, as will be appreciated by those skilled in the art.

One particularly advantageous reason for placing multiple letters on the keys 90 is so that less than a full set of QWERTY keys, as found on a traditional computer/typewriter keyboard, can be used to access all of the English alphabet letters. This advantageously allows the footprint of the keypad 41 to remain relatively small which, in turn, allows the overall size of the cellular telephone 20 to be decreased as well.

Yet, placing multiple symbols on a single key may make typing (e.g., typing emails) more difficult for users. To make typing easier, the controller/microprocessor of the mobile wireless communications device 20 preferably allows symbols/text to be entered in two different modes, namely a multi-tap mode and a predictive mode. In the multi-tap mode, a user enters a desired symbol by pressing a given key a number of times corresponding to its position on the key. Thus, for example, for a user to enter a "W," he would press the QW key twice.

When in the predictive mode, the controller/microprocessor advantageously generates a menu of possible desired words using a stored dictionary of words based upon the key combination that is pressed. As the user presses more keys 90, the possible choices are refined and narrowed. The words in the menu may also be editable so that the user can still enter a desired word or character string even if it is not in the dictionary, for example, as will be appreciated by the skilled in the art.

The cellular telephone 20 also illustratively includes an audio output transducer 28 (e.g., a speaker) carried by the upper housing 24 and accessible to the electronic hearing aid 22 of the user 21 adjacent the top end 26t of the upper housing. Holes 48 may be formed in the upper housing 24 to allow sound from the audio output transducer 28 to pass therethrough to the ear 23 of the user 21. An audio input transducer 29 is carried by the lower housing 25 and accessible to a mouth 31 of the user 21 adjacent the bottom end 27b of the lower housing 25.

Furthermore, an antenna 35 is illustratively carried by the lower housing 25 adjacent the bottom end 27b thereof so that the electronic hearing aid 22 of the user 21 is further separated from the antenna when the upper and lower housings are in the extended use position. Because of the increased separation thus achieved between the antenna 35 and the electronic hearing aid 22 when in the extended use position, the cellular telephone 20 advantageously reduces undesired coupling from the antenna to the electronic hearing aid without the need for special shielding arrangements. Yet, this is done while retaining the benefits of the relatively compact sliding configuration.

More particularly, the bottom 26b of the upper housing 24 overlaps the top 27t of the lower housing 25 in the extended use position to define an overlap region 36 (FIG. 5), and the antenna 35 is illustratively positioned below the overlap region. The cellular telephone 20 further illustratively includes a wireless circuit board 37 (e.g., a printed circuit board (PCB)) carried by the lower housing 25, with one or more wireless communications circuits 38 thereon, such as a wireless transceiver, connected to the antenna 35. An exemplary implementation of the wireless communications circuitry 38 will be discussed further below.

A display 39 (e.g., an LCD display) is also illustratively carried by the upper housing 24 and connected to the circuitry 38. Moreover, a battery 42 is also illustratively carried by the lower housing 25 for powering the circuitry 38 and display 39. It should be noted that while the battery 42 is illustratively shown as being on the wireless circuit board 37 in FIG. 5, the battery need not be carried by the wireless circuit board 37 and is preferably removably connected thereto so that it may be replaced, etc., rather than being connected by a solder connection as the circuitry 38, for example.

The antenna 35 is preferably an internal PCB antenna, in that it is carried within the lower housing 25 and is formed by a plurality of conductive traces on a dielectric substrate, i.e., on the dielectric substrate of the wireless circuit board 37. Generally speaking, internal antennas are more convenient for users because they are less likely to get caught on other objects and allow a cellular telephone to have a smaller footprint than externally mounted antennas. Typically, internal PCB antennas are mounted at the top of the PCB of a cellular telephone adjacent the speaker. In the case of the above-noted Samsung SCH-N330 and Siemens SL55 sliding phones, the antennas are mounted at the top of the PCB within the overlap region between the upper and lower housings. Yet, as noted above, this places the antenna in relatively close proximity to the speaker, which may lead to undesirable coupling to the hearing aid of a user. However, the positioning of the antenna 35 adjacent a bottom end of the lower housing portion in the cellular telephone 20 advantageously reduces such coupling, while still allowing hearing impaired users to enjoy the compact profile of a sliding cellular telephone.

Figure 6:
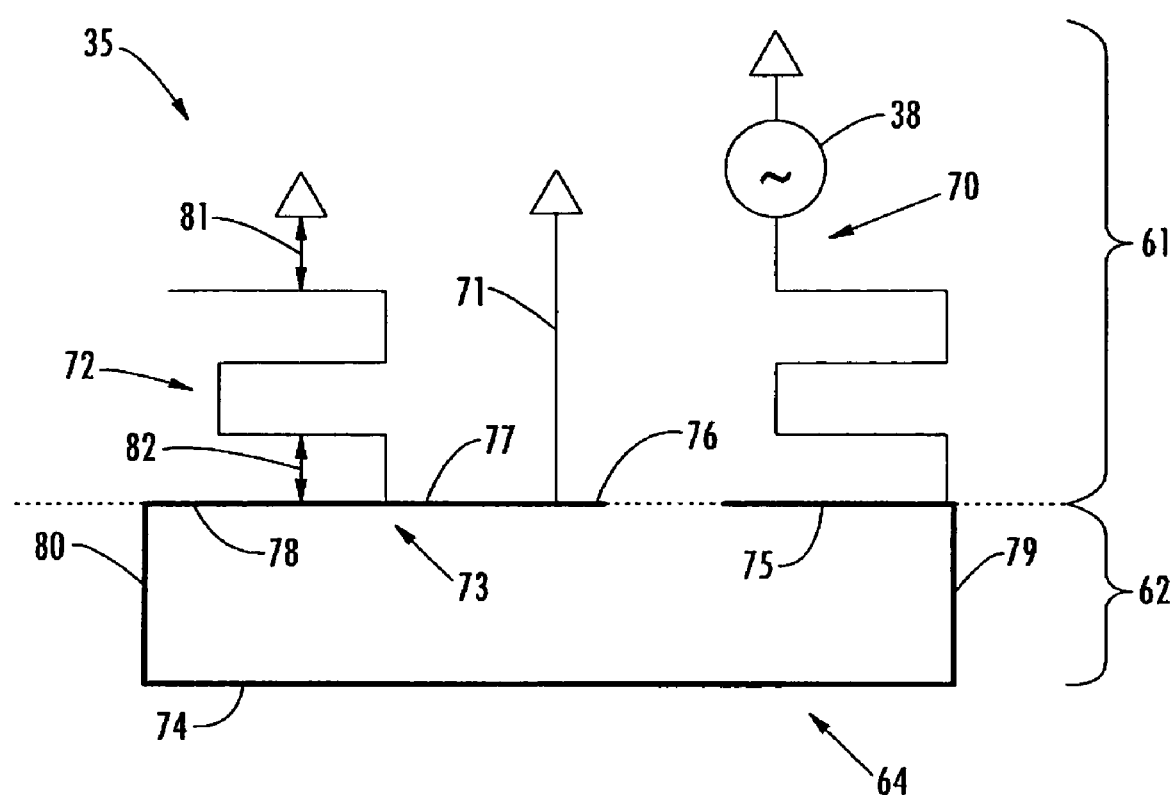
FIG. 6 is a schematic diagram of an exemplary antenna for use with the mobile wireless communications device of FIG. 1.
Figure 7:
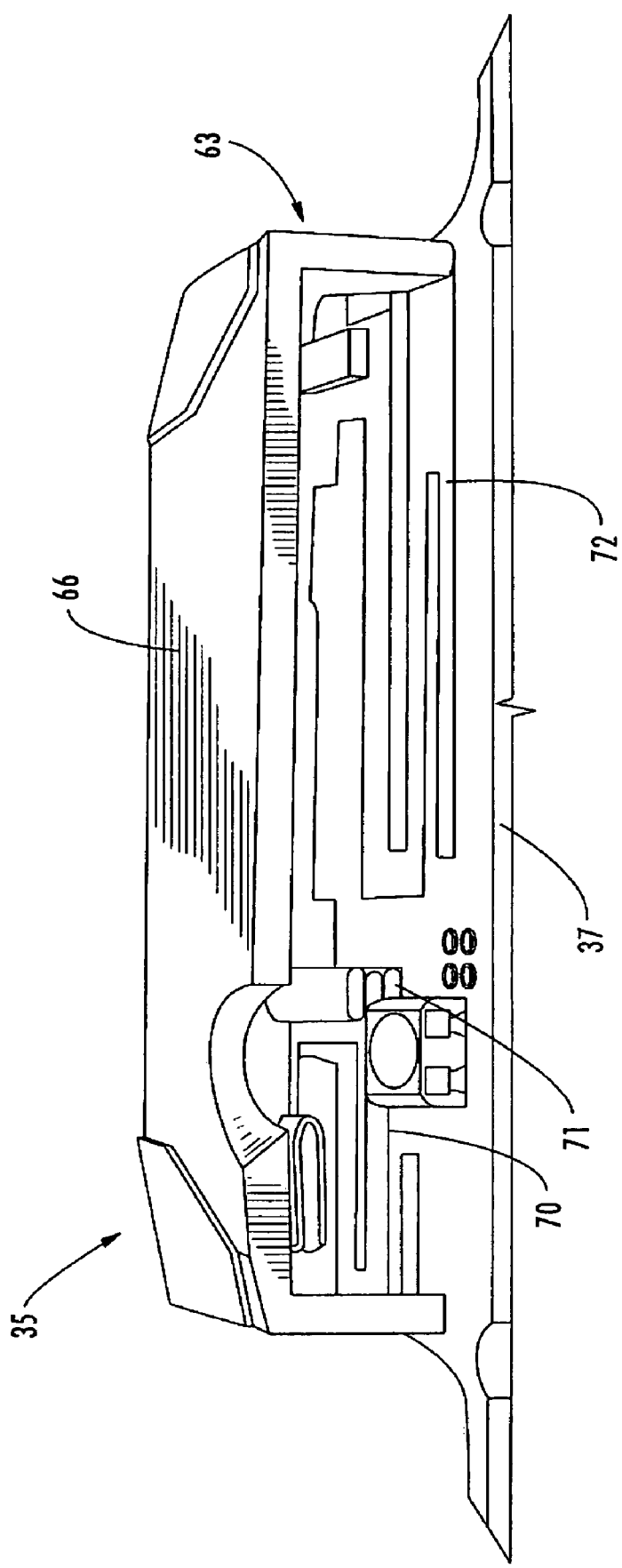
FIGS. 7 and 8 are perspective views of a PCB implementation of the antenna of FIG. 5.
Figure 8:
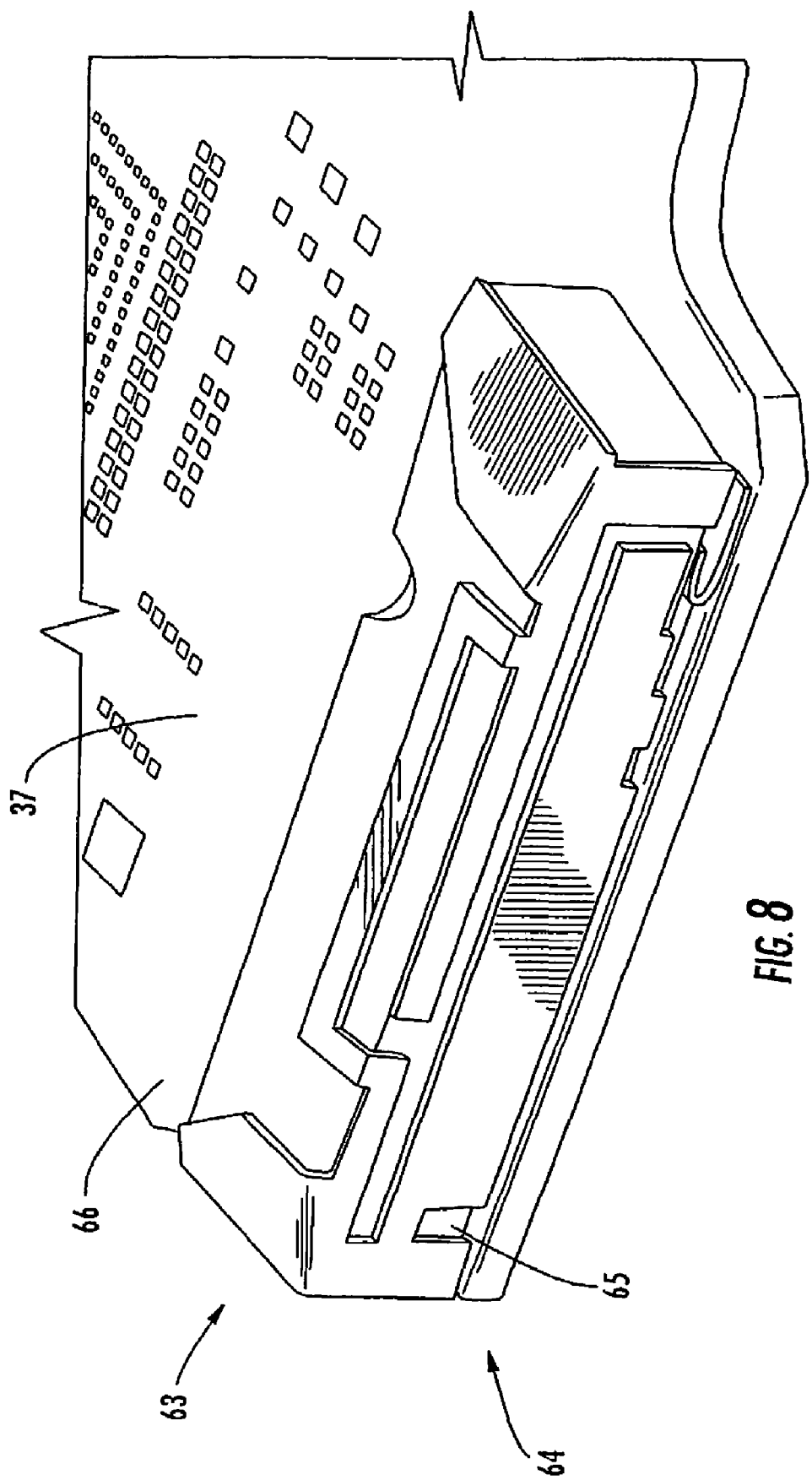

An exemplary implementation of the antenna 35 is now discussed with reference to FIGS. 6 through 8. More particularly, a basic two-dimensional (2D) layout of the antenna 35 is shown in FIG. 6 for clarity of illustration, and a three-dimensional (3D) implementation thereof is illustrated in FIGS. 7 and 8. The antenna 35 is preferably a multi-frequency band antenna which provides enhanced transmission and reception characteristics over multiple operating frequencies. More particularly, the antenna 35 is designed to provide high gain, a low specific absorption ratio (SAR), and a wide bandwidth over multiple cellular bands. By way of example, the antenna 35 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well.

To conserve space, the antenna 35 may advantageously be implemented in three dimensions, as noted above. That is, the antenna 35 illustratively includes a first section 61 on the PCB 37. A second section 62 wraps around from the PCB 37 onto an antenna retainer frame 63 and defines a main loop 64 of the antenna 35. The first and second sections 61, 62 of the antenna 35 may be formed using printed or patterned conductive circuit traces, as will be appreciated by those skilled in the art.

More particularly, the second section 62 is positioned on a first side 65 of the retainer frame 63 that is perpendicular to the PCB 37. This advantageously allows the overall footprint of the antenna 35 on the top (i.e., circuitry) side of the PCB 37 to be significantly reduced. Portions of the main loop 64 may also wrap around onto a second side 66 of the retainer frame 36 to provide still further space savings, as will be discussed further below. It should be noted, however, that the antenna 35 may be implemented in two dimensions (i.e., where the first and second sections 61, 62 are in the same plane), in certain embodiments if enough space is available, and that other b 3D configurations are also possible, as will be appreciated by those skilled in the art.

The first section 61 generally includes a first branch 70 connecting the wireless communications circuitry 38 (which is generally indicated with a signal source symbol in FIG. 6) to the main loop 64, a second branch 71 connecting the main loop to ground (e.g., the ground plane of the PCB 37) (see FIG. 11), and a tuning branch 72 also connected to the main loop. The main loop 64 is defined by sections 75, 79, 74, 80, and 73. The branch 70 may be connected to the wireless communications circuitry 38 with or without a passive matching network, as will be appreciated by those skilled in the art. The branch 71 is preferably connected to ground without a matching network, and the tuning branch 72 is floating (i.e., not connected to the wireless communications circuitry 38.or ground).

Generally speaking, the length of branches 70, 71, and 72 are used to set the center frequency of operation. The square meandering or back-and-forth patterns of branches 70 and 72 illustrated in FIGS. 7 and 8 can be used to change electric length, which varies the center frequency. Moreover, different shapes of the branches 70, 71, 72 may also be used to provide different frequencies. For example, in addition to the illustrated meandering and straight line shapes, other geometries which may be used for these branches include a saw-toothed or triangular meander, a branch with a loop, etc. Various other shapes and combinations thereof may also be used to provide different frequency characteristics, as will be appreciated by those skilled in the art.

The branch 72 is positioned between the sections 77 and 78 of the main loop 64. The position of the branch 72 between sections 77 and 78 may conveniently be varied without significant effect on frequency parameters.

The section 73 of the main loop 64 may also be used to control operating frequency. A variety of shapes and/or cutouts may be used for the section 73. These shapes may include, for example, a "dog bone," a half dog bone, a hairpin, a double hairpin, a hairpin with a loop, a meander, and a sawtooth. If an inductor is needed in certain embodiments to adjust S11 noise source impedance and/or widen bandwidth, a loop type pattern may be used, which creates an additional resonant tuning stage, as will be appreciated by those skilled in the art. If adequate space is available, straight-line portions may be used in the appropriate length. Yet, space is typically at a premium for internal cellular device antennas, and particularly so for compact models such as sliding phones, and thus one of the above-described shapes (or others) will likely be preferred.

The width and shape of the section 74 primarily controls low band gain. The length of section 74 also impacts the operating frequency. However, it should be noted that the lengths of the sections 70, 71, 72, and 73 (i.e., the length of the entire antenna 35) also affects the operating frequency, as is the case with a typical dipole antenna.

Referring more particularly to the sections 79, 74, and 80 of the main loop 64, these sections preferably define a continuous loop starting at the connection point with branch 70 that wraps around and ends at the branch 71. There is a gap in the main loop between branches 70 and 71 at the feed point, as seen in FIG. 6. The main loop 64 may be in a plurality of shapes, widths, and thicknesses. By way of example, the main loop 64 may be generally circular, rectangular, square, polygonal, etc., although other shapes may also be used.

Moreover, the section 74 may also have notches, patches, etc. Patches may be used to add surface area so that the section 74 can shape the beam. It should be noted that, in the case of a cellular telephone, the beam should preferably be directed away from the telephone, i.e., perpendicular to the plane of the PCB 37. By way of example, the width of the antenna 35 may be about 7 cm or less, the height of the first section 61 may be about 1 to 3 cm, and the height of the second section 62 may be about 1 to 3 cm depending upon the given implementation.

Regarding the S11 impedance characteristics, to provide wide bandwidth a good match is needed over the frequency range of interest. Thus, it is desirable to shrink the S11 circle and then move the shrunken circle to the 50 Ohm center point, as will be appreciated by those skilled in the art. The area 73, as well as other portions of the antenna 35, may be used to shrink and/or move the S11 circle, which is preferably done in a distributed fashion. Further, the matching network and meandering portions of the antenna 35 may also be used to move the S11 circle toward the desired 50 Ohm center point. The center of the shrunken S11 circle is less critical since it can advantageously be moved toward the 50 Ohm point as noted above in accordance with the present invention.

In some embodiments, it may be desirable to use an RF current blocking device (i.e., a decoupler/filter) at the connection between the upper and lower housings 24, 25. To provide further noise reduction, in some embodiments the connector traces on the wireless circuit board 37 for the components in the upper housing 24 may be made perpendicular to the direction or axis of sliding of the upper housing and lower housing 25, as will be appreciated by those skilled in the art. Furthermore, the location of the connector between the upper and lower housings 24, 25 may also affect the amount of RF current coupling, so different placements may be desired in different embodiments, as will also be appreciated by those skilled in the art.

General speaking, the above-described antenna 35 allows various shapes and lengths to be utilized to provide appropriate electrical lengths and current distribution. Some shapes are simple delay lines, while other shapes are designed to affect current in a particular area. As noted above, given unlimited space, many of the shapes and geometries described above may not be necessary. However, it is within the space constrained environments of mobile wireless communications devices, such as cellular telephones, where the above-described antenna features are particularly advantageous for providing desired performance over multiple operating bands.

Various changes in the basic layout of the antenna 35 may be made in certain embodiments. By way of example, the tuning branch 72 may be moved so that it extends from section 74 instead of area 73. Other changes are also possible, as will be appreciated by those skilled in the art.

A method aspect of the invention is for making a mobile wireless communications device, such as the cellular telephone 20 discussed above, for a user 21 wearing an electronic hearing aid 22 adjacent an ear 23 of the user. The method may include slidably connecting the upper housing 24 and the lower housing 25 together for sliding relative to one another between the retracted position and the extended use position, as noted above. Further, the audio output transducer 28 is positioned adjacent the top end 26t of the upper housing 24 to be accessible to the electronic hearing aid 22 of the user 21.

Moreover, an audio input transducer 29 is positioned adjacent the bottom end 27b of the lower housing 25 to be accessible to the mouth 31 of the user 21. The method further includes positioning the antenna 35 adjacent the bottom end 27b of the lower housing 25 so that the electronic hearing aid 22 of the user is further separated from the antenna 35 when the upper and lower housings 24, 25 are in the extended use position to thereby reduce undesired coupling from the antenna to the electronic hearing aid, as discussed above. It should be noted that the foregoing steps need not be performed in the exact order as described above.

A related method aspect of the invention is for making a mobile wireless communications device, such as the cellular telephone 20 discussed above, hearing aid compatible for a user wearing an electronic hearing aid 22. The method similarly includes positioning the antenna 35 adjacent the bottom end 27b of the lower housing 25 so that the electronic hearing aid 22 is further separated from the antenna when the upper and lower housings 24, 25 are in the extended use position.

Figure 9:
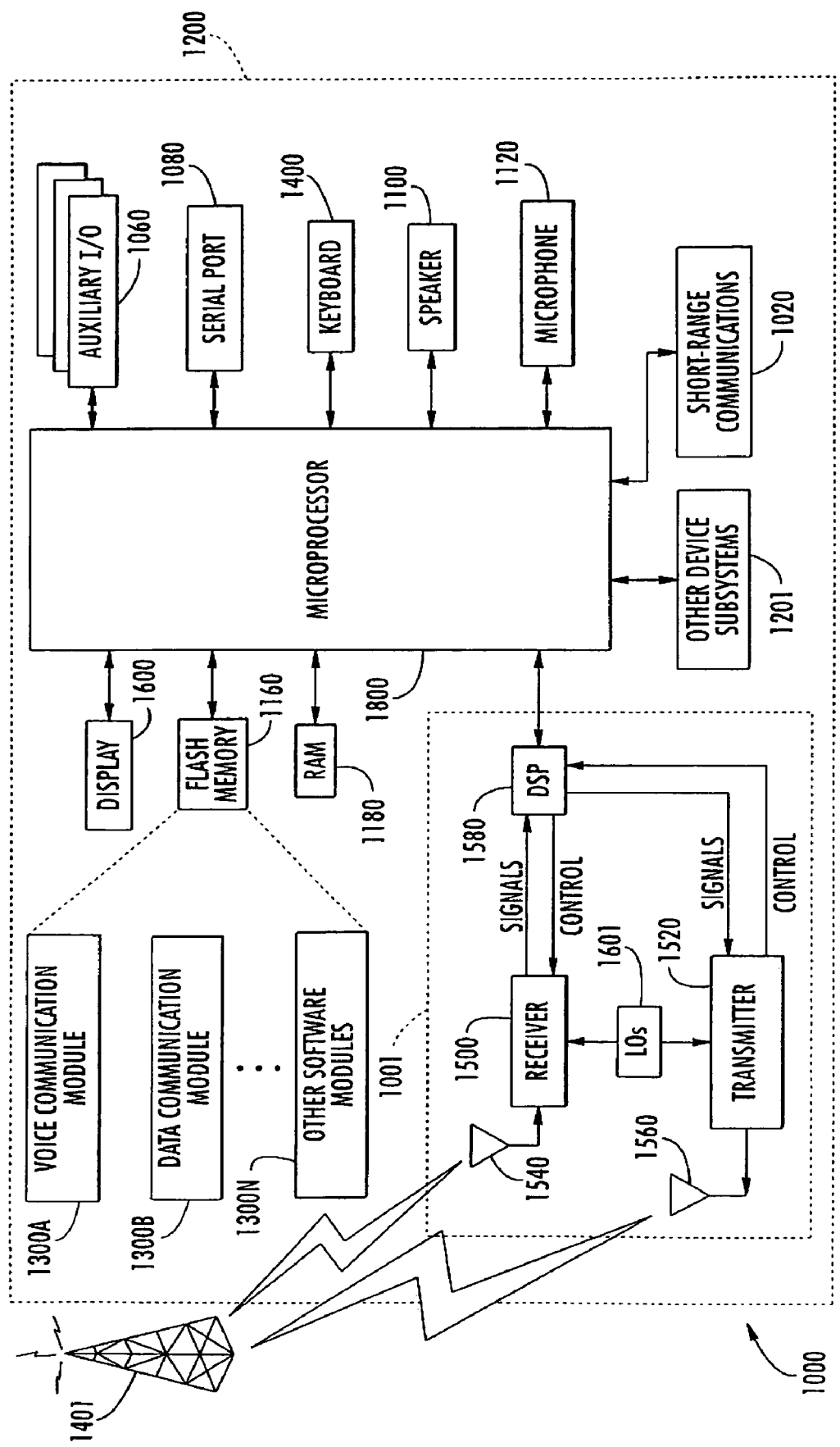
FIG. 9 is a schematic block diagram illustrating exemplary components of a mobile wireless communications device in accordance with the present invention.

Exemplary components which may be used in accordance with the present invention are now described with reference to a handheld mobile wireless communications device 1000 is shown in FIG. 9. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 are shown schematically in FIG. 9. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device for a user wearing an electronic hearing aid adjacent an ear of the user, the mobile wireless communications device comprising:

an upper housing and a lower housing being slidably connected together for sliding relative to one another between a retracted position and an extended use position, said upper and lower housings each having respective top and bottom ends, the top end of said upper housing being further separated from the bottom end of said lower housing when in the extended use position as compared to the retracted position;

an audio output transducer carried by said upper housing and accessible to the electronic hearing aid of the user adjacent the top end of said upper housing;

an audio input transducer carried by said lower housing and accessible to a mouth of the user adjacent the bottom end of said lower housing;

an antenna having portions extending in three dimensions and carried by said lower housing adjacent the bottom end thereof so that the electronic hearing aid of the user is further separated from said antenna when said upper and lower housings are in the extended use position to thereby reduce undesired coupling from said antenna to the electronic hearing aid; and a wireless circuit board carried by said lower housing and at least one wireless communications circuit carried thereby, said at least one wireless communications circuit comprising a wireless transceiver connected to said antenna;

said antenna comprising
a dielectric substrate,
an antenna frame extending outwardly from said dielectric substrate, a plurality of conductive traces on said dielectric substrate, and at least one of said plurality of conductive traces wrapping from said dielectric substrate onto said antenna frame.

2. The mobile wireless communications device of claim 1 wherein the bottom of said upper housing overlaps the top of said lower housing in the extended use position defining an overlap region; and wherein said antenna is below the overlap region.

3. The mobile wireless communications device of claim 1 wherein said antenna is carried within said lower housing.

4. The mobile wireless communications device of claim 1 wherein said antenna comprises a multi-frequency band antenna.

5. The mobile wireless communications device of claim 1 wherein said antenna comprises a single turn, main loop conductor having a gap therein defining first and second ends of said main loop conductor.

6. The mobile wireless communications device of claim 1 further comprising a release catch for allowing movement of said upper housing and said lower housing between the retracted and the extended use positions.

7. The mobile wireless communications device of claim 1 further comprising a display carried by said upper housing.

8. The mobile wireless communications device of claim 1 further comprising an input keypad carried by said lower housing comprising a plurality of multi-symbol keys.

9. The mobile wireless communications device of claim 8 wherein the symbols comprise letters; and
wherein said multi-symbol keys are arranged to define a QWERTY layout.

10. The mobile wireless communications device of claim 8 wherein at least some of said multi-symbol keys have numeric indicia thereon, and wherein the at least some multi-symbol keys are arranged to define a telephone keypad layout.

11. The mobile wireless communications device of claim 1 further comprising a battery carried by said lower housing.

12. A mobile wireless communications device comprising:
an upper housing and a lower housing being slidably connected together for sliding relative to one another between a retracted position and an extended use position, said upper and lower housings each having respective top and bottom ends, the top end of said upper housing being further separated from the bottom end of said lower housing when in the extended use position as compared to the retracted position;
an audio output transducer carried by said upper housing and accessible to an ear of a user adjacent the top end of said upper housing;
an audio input transducer carried by said lower housing and accessible to a mouth of the user adjacent the bottom end of said lower housing;
an antenna having portions extending in three dimensions and carried by said lower housing adjacent the bottom end thereof so that the ear of the user is further separated from said antenna when said upper and lower housings are in the extended use position; and
a wireless circuit board carried by said lower housing and at least one wireless communications circuit carried thereby, said at least one wireless communications circuit comprising a wireless transceiver connected to said antenna;
said antenna comprising
a dielectric substrate,
an antenna frame extending outwardly from said dielectric substrate,
a plurality of conductive traces on said dielectric substrate, and at least one of said plurality of conductive traces wrapping from said dielectric substrate onto said antenna frame.

13. The mobile wireless communications device of claim 12 wherein the bottom of said upper housing overlaps the top of said lower housing in the extended position defining an overlap region; and wherein said antenna is below the overlap region.

14. The mobile wireless communications device of claim 12 wherein said antenna is carried within said lower housing.

15. The mobile wireless communications device of claim 12 wherein said antenna comprises a multi-frequency band antenna.

16. The mobile wireless communications device of claim 12 wherein said antenna comprises a single turn, main loop conductor having a gap therein defining first and second ends of said main loop conductor.

17. The mobile wireless communications device of claim 12 further comprising a release catch for allowing movement of said upper housing and said lower housing between the retracted and the extended use positions.

18. The mobile wireless communications device of claim 12 further comprising a display carried by said upper housing.

19. The mobile wireless communications device of claim 12 further comprising an input keypad carried by said lower housing comprising a plurality of multi-symbol keys.

20. The mobile wireless communications device of claim 19 wherein the symbols comprise letters; and
wherein said multi-symbol keys are arranged to define a QWERTY layout.

21. The mobile wireless communications device of claim 19 wherein at least some of said multi-symbol keys have numeric indicia thereon, and wherein the at least some multi-symbol keys are arranged to define a telephone keypad layout.

22. The mobile wireless communications device of claim 12 further comprising a battery carried by said lower housing.

23. A method for making a mobile wireless communications device for a user wearing an electronic hearing aid adjacent an ear of the user, the method comprising:
slidably connecting an upper housing and a lower housing together for sliding relative to one another between a retracted position and an extended use position, the upper and lower housings each having respective top and bottom ends, the top end of the upper housing being further separated from the bottom end of the lower housing when in the extended use position as compared to the retracted position;
positioning an audio output transducer adjacent the top end of the upper housing to be accessible to the electronic hearing aid of the user;
positioning an audio input transducer adjacent the bottom end of the lower housing to be accessible to a mouth of the user;
positioning an antenna having portions extending in three dimensions adjacent the bottom end of the lower housing so that the electronic hearing aid of the user is further separated from the antenna when the upper and lower housings are in the extended use position to thereby reduce undesired coupling from the antenna to the electronic hearing aid; and
positioning a wireless circuit board having at least one wireless communications circuit carried thereby in the lower housing, the at least one wireless communications circuit comprising a wireless transceiver connected to the antenna;

the antenna comprising
a dielectric substrate,
an antenna frame extending outwardly from the dielectric substrate,
a plurality of conductive traces on the dielectric substrate, and
at least one of the plurality of conductive traces wrapping from the dielectric substrate onto the antenna frame.

24. The method of claim 23 wherein the bottom of the upper housing overlaps the top of the lower housing in the extended use position defining an overlap region; and wherein the antenna is below the overlap region.

25. The method of claim 23 wherein the antenna is carried within the lower housing.

26. The method of claim 23 wherein the antenna comprises a multi-frequency band antenna.

27. The method of claim 23 wherein the antenna comprises a single turn, main loop conductor having a gap therein defining first and second ends of the main loop conductor.

28. A method for making a mobile wireless communications device hearing aid compatible for a user wearing an electronic hearing aid adjacent an ear of the user, the mobile wireless communications device comprising an upper housing and a lower housing being slidably connected together for sliding relative to one another between a retracted position and an extended use position, an audio output transducer carried by the upper housing and accessible to an ear of a user adjacent the top end of said upper housing, and an audio input transducer carried by the lower housing and accessible to a mouth of the user adjacent the bottom end of the lower housing, the upper and lower housings each having respective top and bottom ends, the top end of the upper housing being further separated from the bottom end of the lower housing when in the extended use position as compared to the retracted position, the method comprising:

positioning an antenna having portions extending in three dimensions adjacent the bottom end of the lower housing so that the electronic hearing aid of the user is further separated from the antenna when the upper and lower housings are in the extended use position to thereby reduce undesired coupling from the antenna to the electronic hearing aid; and positioning a wireless circuit board having at least one wireless communications circuit carried thereby in the lower housing, the at least one wireless communications circuit comprising a wireless transceiver connected to the antenna;

the antenna comprising
a dielectric substrate,
an antenna frame extending outwardly from the dielectric substrate,
a plurality of conductive traces on the dielectric substrate, and
at least one of the plurality of conductive traces wrapping from the dielectric substrate onto the antenna frame.

29. The method of claim 28 wherein the bottom of the upper housing overlaps the top of the lower housing in the extended use position defining an overlap region; and wherein the antenna is positioned below the overlap region.

30. The method of claim 28 wherein the antenna is carried within the lower housing.

31. The method of claim 28 wherein the antenna comprises a multi-frequency band antenna.

32. The method of claim 28 wherein the antenna comprises a single turn, main loop conductor having a gap therein defining first and second ends of the main loop conductor.

* * * * *